United States Patent
Mobley et al.

(10) Patent No.: US 9,145,319 B2
(45) Date of Patent: Sep. 29, 2015

(54) SUBMERGED COMBUSTION MELTER COMPRISING A MELT EXIT STRUCTURE DESIGNED TO MINIMIZE IMPACT OF MECHANICAL ENERGY, AND METHODS OF MAKING MOLTEN GLASS

(75) Inventors: John Euford Mobley, Vonore, TN (US); Aaron Morgan Huber, Castle Rock, CO (US); Ryan Patrick Enright, Denver, CO (US)

(73) Assignee: Johns Manville, Denver, CO (US)

( * ) Notice: Subject to any disclaimer, the term of this patent is extended or adjusted under 35 U.S.C. 154(b) by 383 days.

(21) Appl. No.: 13/458,211

(22) Filed: Apr. 27, 2012

(65) Prior Publication Data

US 2013/0283861 A1 Oct. 31, 2013

(51) Int. Cl.
| | |
|---|---|
| C03B 5/20 | (2006.01) |
| C03B 5/42 | (2006.01) |
| C03B 5/44 | (2006.01) |
| C03B 5/167 | (2006.01) |
| C03B 5/235 | (2006.01) |
| C03B 5/26 | (2006.01) |
| C03B 3/02 | (2006.01) |
| C03B 5/04 | (2006.01) |
| C03B 3/00 | (2006.01) |

(52) U.S. Cl.
CPC ............... C03B 5/167 (2013.01); C03B 3/023 (2013.01); C03B 5/04 (2013.01); C03B 5/20 (2013.01); C03B 5/2356 (2013.01); C03B 5/26 (2013.01); C03B 5/44 (2013.01); C03B 3/00 (2013.01); C03B 2211/22 (2013.01); C03B 2211/70 (2013.01)

(58) Field of Classification Search
CPC ............ C03B 5/167; C03B 5/20; C03B 5/26; C03B 5/262; C03B 5/44; C03B 5/2356; C03B 3/00; C03B 2211/70; C03B 5/205; C03B 2211/22
See application file for complete search history.

(56) References Cited

U.S. PATENT DOCUMENTS

| | | | | |
|---|---|---|---|---|
| 1,579,353 | A * | 4/1926 | Good | 65/326 |
| 1,636,151 | A * | 7/1927 | Shaw | 65/347 |
| 1,679,295 | A * | 7/1928 | Dodge | 65/171 |
| 1,875,474 | A * | 9/1932 | McKinley | 65/347 |
| 1,883,023 | A * | 10/1932 | Slick | 65/168 |
| 1,937,321 | A * | 11/1933 | Howard | 65/162 |
| 1,944,855 | A * | 1/1934 | Wadman | 373/32 |
| 1,989,103 | A | 1/1935 | McKelvey et al. | |

(Continued)

FOREIGN PATENT DOCUMENTS

DE  44 24 814 A1  1/1996

*Primary Examiner* — Jason L Lazorcik
(74) *Attorney, Agent, or Firm* — Robert D. Touslee (57) ABSTRACT

A melter apparatus includes a floor, a ceiling, and a wall connecting the floor and ceiling at a perimeter of the floor and ceiling, a melting zone being defined by the floor, ceiling and wall, the melting zone having a feed inlet and a molten glass outlet positioned at opposing ends of the melting zone. Melter apparatus include an exit end having a melter exit structure for discharging turbulent molten glass formed by one or more submerged combustion burners, the melter exit structure fluidly and mechanically connecting the melter vessel to a molten glass conditioning channel. The melter exit structure includes a fluid-cooled transition channel configured to form a frozen glass layer or highly viscous glass layer, or combination thereof, on inner surfaces of the fluid-cooled transition channel and thus protect the melter exit structure from mechanical energy imparted from the melter vessel to the melter exit structure.

8 Claims, 10 Drawing Sheets

(56) References Cited

U.S. PATENT DOCUMENTS

| | | | |
|---|---|---|---|
| 2,042,560 A * | 6/1936 | Stewart | 432/238 |
| 2,064,546 A * | 12/1936 | Kutchka | 65/206 |
| 2,455,907 A | 1/1948 | Slayter | |
| 2,658,094 A * | 11/1953 | Nonken | 373/32 |
| 2,677,003 A * | 4/1954 | Arbeit et al. | 65/346 |
| 2,691,689 A * | 10/1954 | Arbeit et al. | 65/135.8 |
| 3,170,781 A | 2/1965 | Keefer | |
| 3,226,220 A * | 12/1965 | Plumat | 65/342 |
| 3,237,929 A | 3/1966 | Plumat et al. | |
| 3,260,587 A | 7/1966 | Dolf et al. | |
| 3,294,512 A | 12/1966 | Penberthy | |
| 3,421,876 A * | 1/1969 | Schmidt | 65/346 |
| 3,606,825 A | 9/1971 | Johnson | |
| 3,627,504 A | 12/1971 | Johnson et al. | |
| 3,738,792 A | 6/1973 | Feng | |
| 3,764,287 A | 10/1973 | Brocious | |
| 3,856,496 A | 12/1974 | Nesbitt et al. | |
| 3,976,464 A * | 8/1976 | Wardlaw | 65/337 |
| 4,205,966 A | 6/1980 | Horikawa | |
| 4,349,376 A * | 9/1982 | Dunn et al. | 65/345 |
| 4,360,373 A | 11/1982 | Pecoraro | |
| 4,539,034 A | 9/1985 | Hanneken | |
| 4,798,616 A | 1/1989 | Knavish et al. | |
| 4,812,372 A * | 3/1989 | Kithany | 428/664 |
| 4,818,265 A * | 4/1989 | Krumwiede et al. | 65/136.4 |
| 4,900,337 A * | 2/1990 | Zortea et al. | 65/135.8 |
| 4,932,035 A * | 6/1990 | Pieper | 373/32 |
| 5,522,721 A | 6/1996 | Drogue et al. | |
| 5,613,994 A * | 3/1997 | Muniz et al. | 65/339 |
| 6,044,667 A * | 4/2000 | Chenoweth | 65/540 |
| 6,178,777 B1 | 1/2001 | Chenoweth | |
| 6,339,610 B1 * | 1/2002 | Hoyer et al. | 373/32 |
| 6,460,376 B1 | 10/2002 | Jeanvoine et al. | |
| 6,739,152 B2 | 5/2004 | Jeanvoine et al. | |
| 6,857,999 B2 | 2/2005 | Jeanvoine et al. | |
| 6,883,349 B1 | 4/2005 | Jeanvoine | |
| 7,273,583 B2 * | 9/2007 | Rue et al. | 266/266 |
| 7,428,827 B2 | 9/2008 | Maugendre et al. | |
| 7,448,231 B2 | 11/2008 | Jeanvoine et al. | |
| 7,565,819 B2 | 7/2009 | Jeanvoine et al. | |
| 7,946,136 B2 * | 5/2011 | Watkinson | 65/441 |
| 8,402,787 B2 * | 3/2013 | Purnode et al. | 65/134.1 |
| 2002/0134112 A1 | 9/2002 | Barrow et al. | |
| 2002/0162358 A1 | 11/2002 | Jeanvoine et al. | |
| 2002/0166343 A1 | 11/2002 | LeBlanc | |
| 2003/0015000 A1 | 1/2003 | Hayes et al. | |
| 2003/0029197 A1 | 2/2003 | Jeanvoine et al. | |
| 2003/0037571 A1 | 2/2003 | Kobayashi et al. | |
| 2004/0131988 A1 | 7/2004 | Baker et al. | |
| 2004/0168474 A1 | 9/2004 | Jeanvoine et al. | |
| 2004/0224833 A1 | 11/2004 | Jeanvoine et al. | |
| 2005/0083989 A1 * | 4/2005 | Leister et al. | 373/27 |
| 2006/0000239 A1 | 1/2006 | Jeanvoine et al. | |
| 2007/0051136 A1 * | 3/2007 | Watkinson | 65/384 |
| 2007/0122332 A1 | 5/2007 | Jacques et al. | |
| 2007/0212546 A1 | 9/2007 | Jeanvoine et al. | |
| 2008/0256981 A1 | 10/2008 | Jacques et al. | |
| 2008/0276652 A1 * | 11/2008 | Bauer et al. | 65/454 |
| 2009/0042709 A1 | 2/2009 | Jeanvoine et al. | |
| 2010/0139325 A1 * | 6/2010 | Watkinson | 65/488 |
| 2011/0088432 A1 * | 4/2011 | Purnode et al. | 65/181 |
| 2011/0236846 A1 * | 9/2011 | Rue et al. | 432/195 |
| 2011/0308280 A1 * | 12/2011 | Huber | 65/126 |
| 2012/0077135 A1 * | 3/2012 | Charbonneau | 432/11 |
| 2013/0283861 A1 * | 10/2013 | Mobley et al. | 65/135.1 |
| 2013/0327092 A1 * | 12/2013 | Charbonneau | 65/29.21 |
| 2014/0090423 A1 * | 4/2014 | Charbonneau et al. | 65/134.5 |
| 2014/0144185 A1 * | 5/2014 | Shock et al. | 65/134.9 |

\* cited by examiner

SUBMERGED COMBUSTION MELTER COMPRISING A MELT EXIT STRUCTURE DESIGNED TO MINIMIZE IMPACT OF MECHANICAL ENERGY, AND METHODS OF MAKING MOLTEN GLASS

BACKGROUND INFORMATION

1. Technical Field

The present disclosure relates generally to the field of combustion furnaces and methods of use, and more specifically to improved submerged combustion melters and methods of use in producing molten glass.

2. Background Art

In submerged combustion glass melting, combustion gases are injected beneath the surface of the molten glass and rise upward through the melt. The glass is heated at a high efficiency via the intimate contact with the combustion gases. The melter exit may be connected to a conditioning channel. Using submerged combustion burners produces violent turbulence of the molten glass and results in a high degree of mechanical energy in the submerged combustion melter that, without modification, is undesirably transferred to the conditioning channel. Given that long life is a goal for submerged combustion melters and conditioning channels attached thereto, this transference of mechanical energy from the melter to the conditioning channel is a significant detriment to that goal. While transference of mechanical energy from the melter to the conditioning channel is a detriment, and could be eliminated entirely if the melter were physically decoupled from the conditioning channel, it is also desired that the heat contained in the submerged combustion melter be fully or nearly fully transferred to the conditioning channel. So in some respects these two goals are at odds, presenting a challenge to operators of submerged combustion melters not present in conventional melters (i.e., not a submerged combustion melter).

U.S. Pat. No. 6,178,777 discloses a conventional, non-submerged combustion glass melter having a water-cooled throat, and U.S. Pat. No. 4,349,376 discloses a conventional, non-submerged combustion glass melter having a water-cooled skimmer. As neither of these references discloses submerged combustion melters, the problem of mechanical energy transfer from the highly turbulent melter to the conditioning channel is largely non-existent. In fact, due to the significantly less turbulent conditions of conventional glass melters, conditioning may actually begin in the glass melter.

It would be a significant advance in the glass melting art to develop melter exit structures between submerged combustion melter vessels and conditioning channels that are able to reduce or substantially eliminate the transference of mechanical energy from the submerged combustion melter vessel to the conditioning channel, while maintaining a minimal glass temperature drop for the glass flowing between the submerged combustion melter and the conditioning channel.

SUMMARY

In accordance with the present disclosure, melters and methods of using them are described that reduce or eliminate transference of mechanical energy from the submerged combustion melter to the conditioning channel, while maintaining or increasing heat transfer between the submerged combustion melter and the conditioning channel. The apparatus and methods described herein are relevant to the full range of materials that could be melted with submerged combustion technology.

A first aspect of this disclosure is a melter apparatus comprising:

a melter vessel comprising floor, a ceiling, a wall connecting the floor and ceiling at a perimeter of the floor and ceiling, wherein at least some of the wall comprises fluid-cooled panels, a melting zone being defined by the floor, ceiling and wall, and a plurality of burners (air-fuel and/or oxy-fuel burners), at least some of which are positioned to direct combustion products into the melting zone under a level of molten glass in the melting zone and form a turbulent molten glass imparting mechanical energy to the melter vessel, the melter vessel comprising a batch feeder attached to the wall or ceiling above the level, and an exit end comprising a melter exit structure for discharging the molten glass, the melter exit structure fluidly and mechanically connecting the melter vessel to a molten glass conditioning channel, wherein the melter exit structure comprises a fluid-cooled transition channel configured to form a frozen glass layer or highly viscous glass layer, or combination thereof, on inner surfaces of the fluid-cooled transition channel and thus protect the melter exit structure from the mechanical energy imparted from the melter vessel to the melter exit structure.

A second aspect of this disclosure is a melter apparatus comprising:

a melter vessel comprising floor, a ceiling, a wall connecting the floor and ceiling at a perimeter of the floor and ceiling, wherein at least some of the wall comprises fluid-cooled panels, a melting zone being defined by the floor, ceiling and wall, and a plurality of burners (air-fuel and/or oxy-fuel burners), at least some of which are positioned to direct combustion products into the melting zone under a level of molten glass in the melting zone and form a turbulent molten glass imparting mechanical energy to the melter vessel, the melter vessel comprising a batch feeder attached to the wall or ceiling above the level, and an exit end comprising a melter exit structure for discharging the molten glass, the melter exit structure fluidly and mechanically connecting the melter vessel to a molten glass conditioning channel;

wherein the melter exit structure comprises a fluid-cooled transition channel configured to form a frozen glass layer or highly viscous glass layer, or combination thereof, on inner surfaces of the fluid-cooled transition channel and thus protect the melter exit structure from the mechanical energy imparted from the melter vessel to the melter exit structure;

the melter apparatus further comprising a fluid-cooled skimmer configured to form a frozen glass layer or highly viscous glass layer, or combination thereof, on outer surfaces thereof, the skimmer extending downward from the ceiling of the melter vessel and positioned upstream of the fluid-cooled transition channel, the skimmer having a lower distal end defining a top of a throat of the melter vessel, the throat configured to control flow of molten glass from the melter vessel into the melter exit structure.

A third aspect of this disclosure is a method comprising:

a) feeding at least one partially vitrifiable material into a feed inlet of a melting zone of a melter vessel comprising a floor, a ceiling, and a wall connecting the floor and ceiling at a perimeter of the floor and ceiling, the melter vessel comprising a batch feeder attached to the wall or ceiling and an exit end comprising a melter exit structure for discharging molten glass, the melter exit structure fluidly and mechanically connecting the melter vessel to a molten glass conditioning channel;

b) heating the at least one partially vitrifiable material with at least one air-fuel and/or oxy-fuel burner directing combustion products into the melting zone under a level of the molten glass in the zone, and forming the turbulent molten glass while imparting mechanical energy to the melter vessel;

c) discharging molten glass from the melter vessel through a fluid-cooled transition channel of the melter exit structure; and d) cooling the fluid-cooled transition channel sufficiently to form a frozen glass layer or highly viscous glass layer, or combination thereof, on inner surfaces of the fluid-cooled transition channel thus protecting the melter exit structure from the mechanical energy imparted from the melter vessel to the melter exit structure.

Melter apparatus and methods of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of various melter apparatus and process embodiments in accordance with the present disclosure. However, it will be understood by those skilled in the art that the melter apparatus and processes of using same may be practiced without these details and that numerous variations or modifications from the described embodiments may be possible which are nevertheless considered within the appended claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

"Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

The phrase "turbulent molten glass imparting mechanical energy to the melter vessel" means that during submerged combustion, the molten glass is very turbulent, sometimes extraordinarily so. This high degree of turbulence can increase the mechanical load on the melter vessel walls significantly, especially in embodiments where the walls are fluid-cooled, as fluid-cooled wall structures may be made thinner than non-cooled walls since the frozen or highly viscous glass layer protects the walls better than non-cooled walls. Therefore, while there may be savings in cost of materials for submerged combustion melter vessels with thinner, fluid-cooled walls, and fuel savings due to better heat transfer to the melt, there may be adverse physical impacts on the melter structure due to the very high turbulence imparted during submerged combustion.

The term "air-fuel burner" means a combustion burner that combusts one or more fuels with only air, while the term "oxy-fuel burner" means a combustion burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. "Air" as used herein includes ambient air as well as gases having the same molar concentration of oxygen as air. "Oxygen-enriched air" means air having oxygen concentration greater than 21 mole percent. "Oxygen" includes "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The term "fuel", according to this disclosure, means a combustible composition (either in gaseous, liquid, or solid form, or any flowable combination of these) comprising a major portion of, for example, methane, natural gas, liquefied natural gas, propane, atomized oil, powders or the like. Fuels useful in the disclosure may comprise minor amounts of non-fuels therein, including oxidants, for purposes such as premixing the fuel with the oxidant, or atomizing liquid fuels.

At least some of the burners may be floor-mounted, and in certain embodiments the floor-mounted burners may be positioned in one or more parallel rows substantially perpendicular to a longitudinal axis of the melter. In certain embodiments, the number of floor-mounted burners in each row may be proportional to width of the melter. In certain embodiments the depth of the melter may decrease as width of the melter decreases. In certain other embodiments, an intermediate location may comprise a constant width zone positioned between an expanding zone and a narrowing zone of the melter, in accordance with assignee's co-pending U.S. patent application Ser. No. 12/817,754, filed Jun. 17, 2010, published as US 20110308280 on Dec. 22, 2011.

At least some of the burners may be oxy-fuel burners. In certain embodiments the oxy-fuel burners may comprise one or more submerged oxy-fuel combustion burners each having co-axial fuel and oxidant tubes forming an annular space there between, wherein the outer tube extends beyond the end of the inner tube, as taught in U.S. Pat. No. 7,273,583. In certain other embodiments the oxy-fuel burners may comprise one or more adjustable flame submerged oxy-fuel combustion burners as taught in assignee's co-pending U.S. patent application Ser. No. 13/268,028, filed Oct. 7, 2011.

In certain embodiments, the melter apparatus may have a floor size for a given throughput of 2 ft$^2$/stpd or less, and in certain embodiment may have a floor size for a given throughput of 0.5 ft$^2$/stpd or less, where "stpd" means "short tons per day." Stated differently, in certain embodiments, the methods herein may comprise discharging at least 0.5 short tons per day per square foot of melter floor, and in certain exemplary processes, at least 2 short tons per day per square foot of melter floor.

The term "fluid-cooled" means cooling using gaseous, liquid, or combination thereof, heat transfer media. In certain exemplary embodiments, wherein the melter wall comprises fluid-cooled panels, the wall may comprise a refractory liner at least between the panels and the molten glass.

Certain exemplary apparatus and methods may comprise cooling various components using fluid-cooled refractory panels and directing a heat transfer fluid through the panels. In certain embodiments, the refractory cooled-panels comprising the walls, the fluid-cooled skimmer, the fluid-cooled dam, and the walls of the fluid-cooled transition channel may be cooled by a heat transfer fluid selected from the group consisting of gaseous, liquid, or combinations of gaseous and liquid compositions that functions or is capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Figure 1:
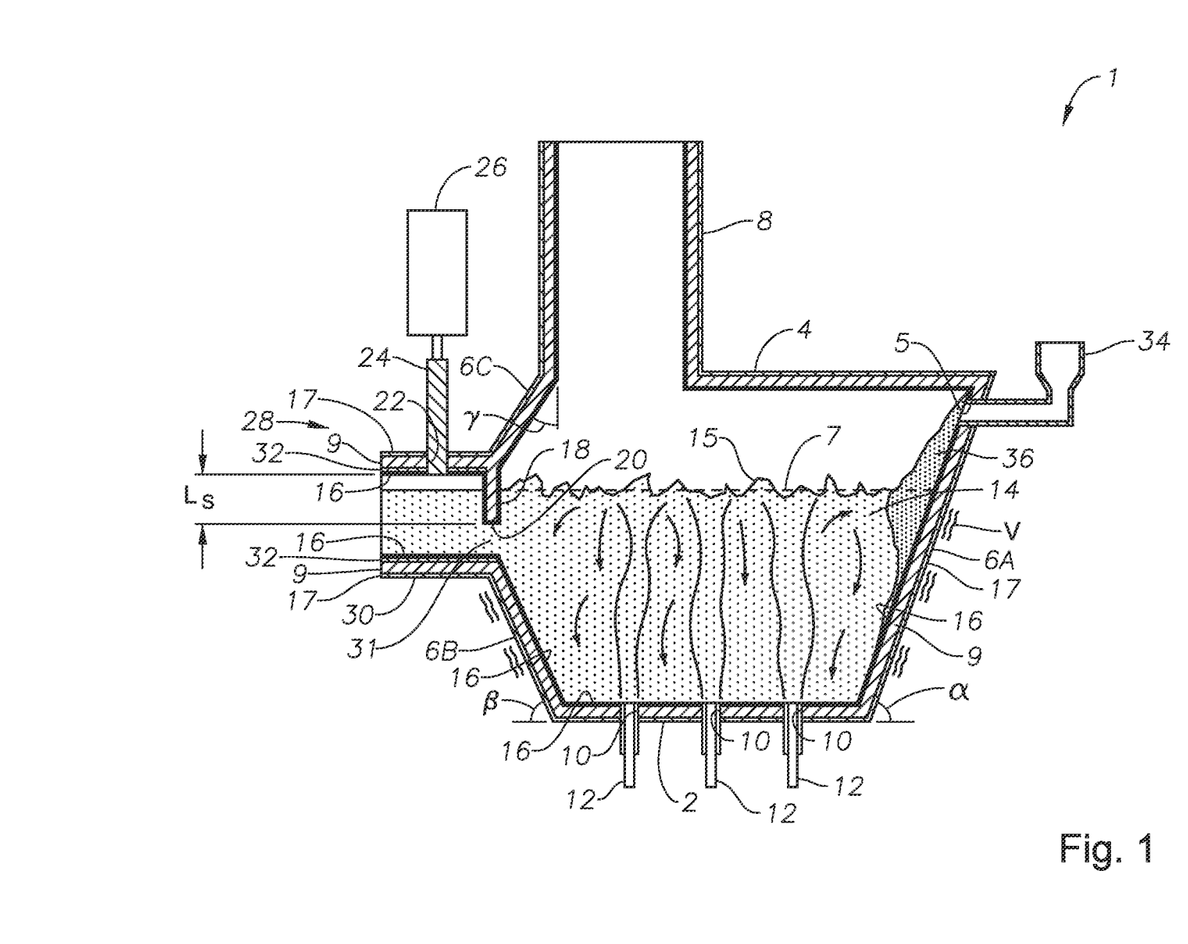
FIGS. 1, 3, and 5, are vertical sectional views, of three melter embodiments in accordance with the present disclosure.
Figure 2:
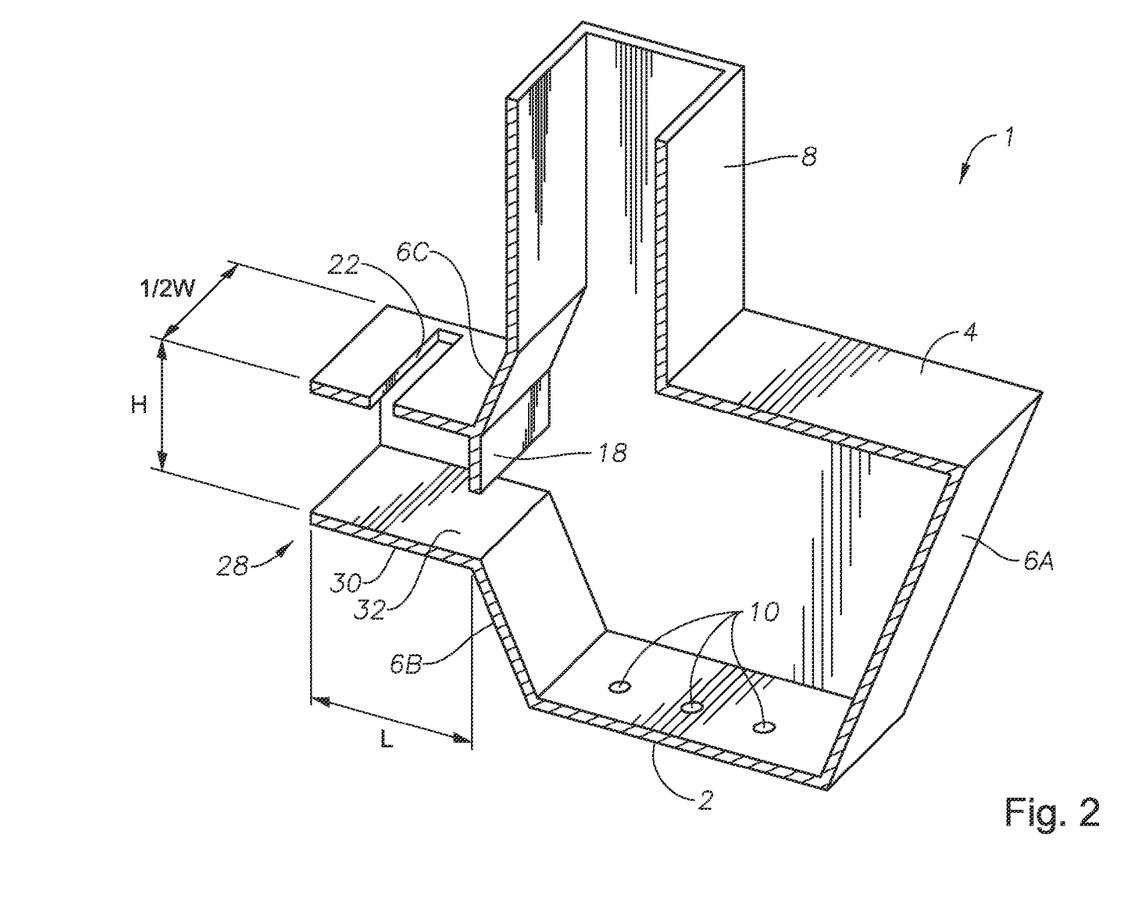
FIGS. 2, 4, and 6 are perspective views of the sectional views of the melter embodiments illustrated in FIGS. 1, 3, and 5, respectively.
Figure 3:
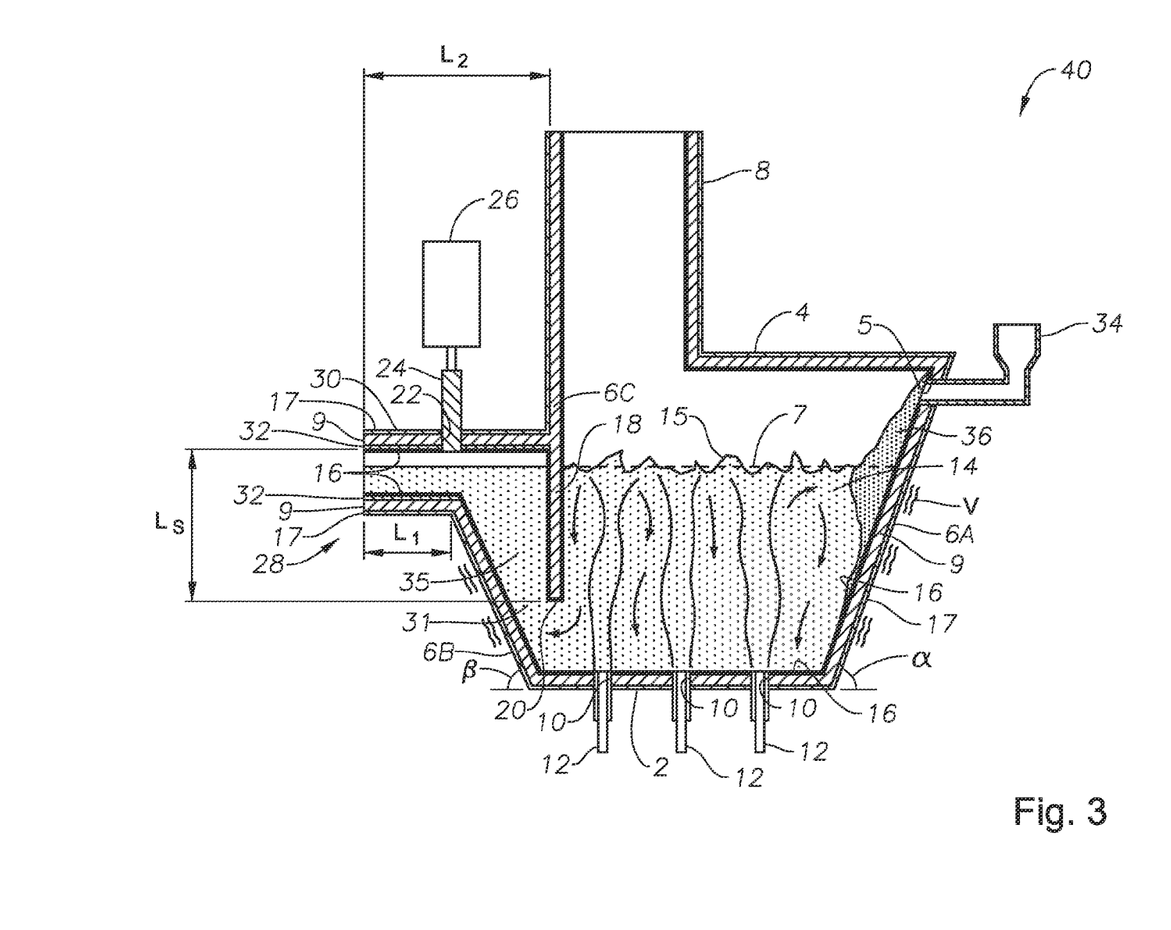
Figure 4:
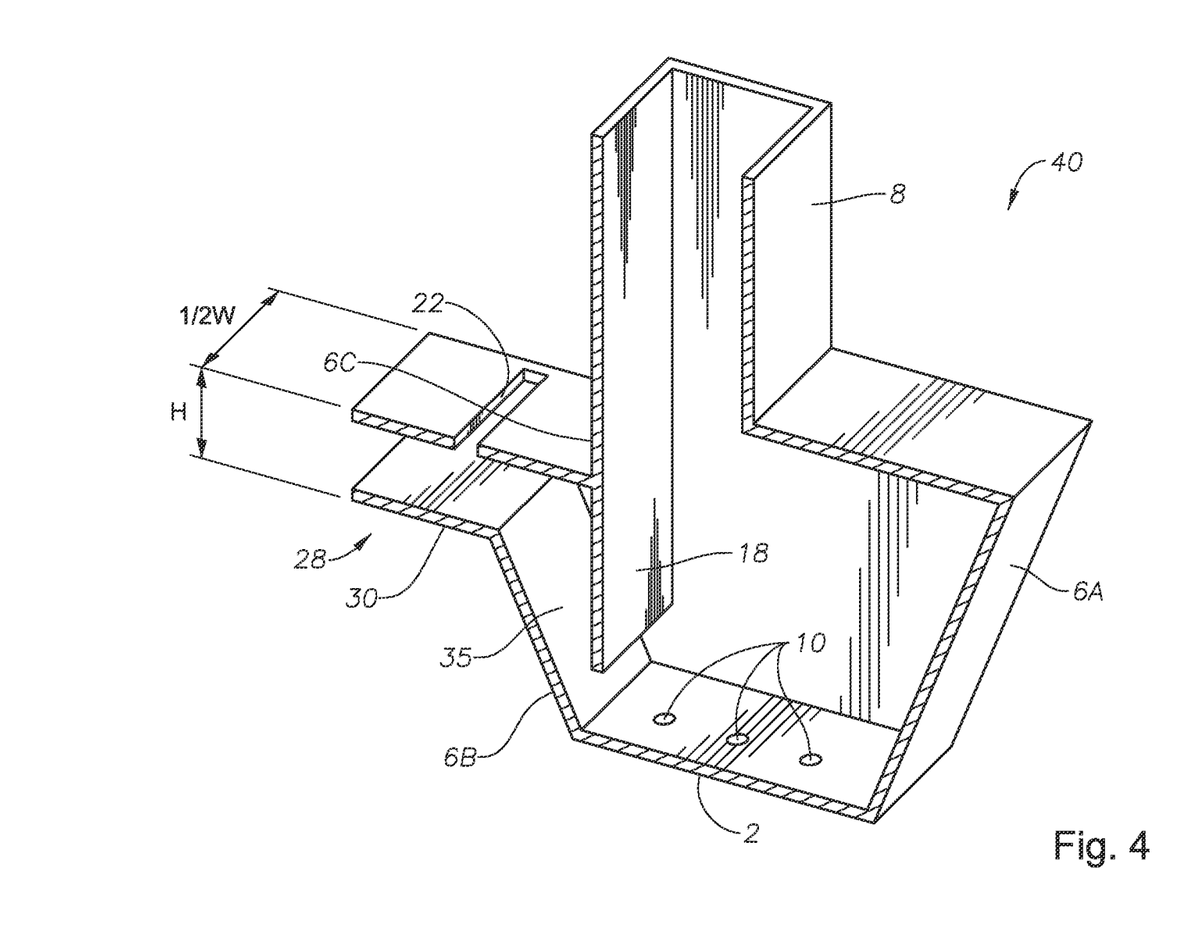
Figure 5:
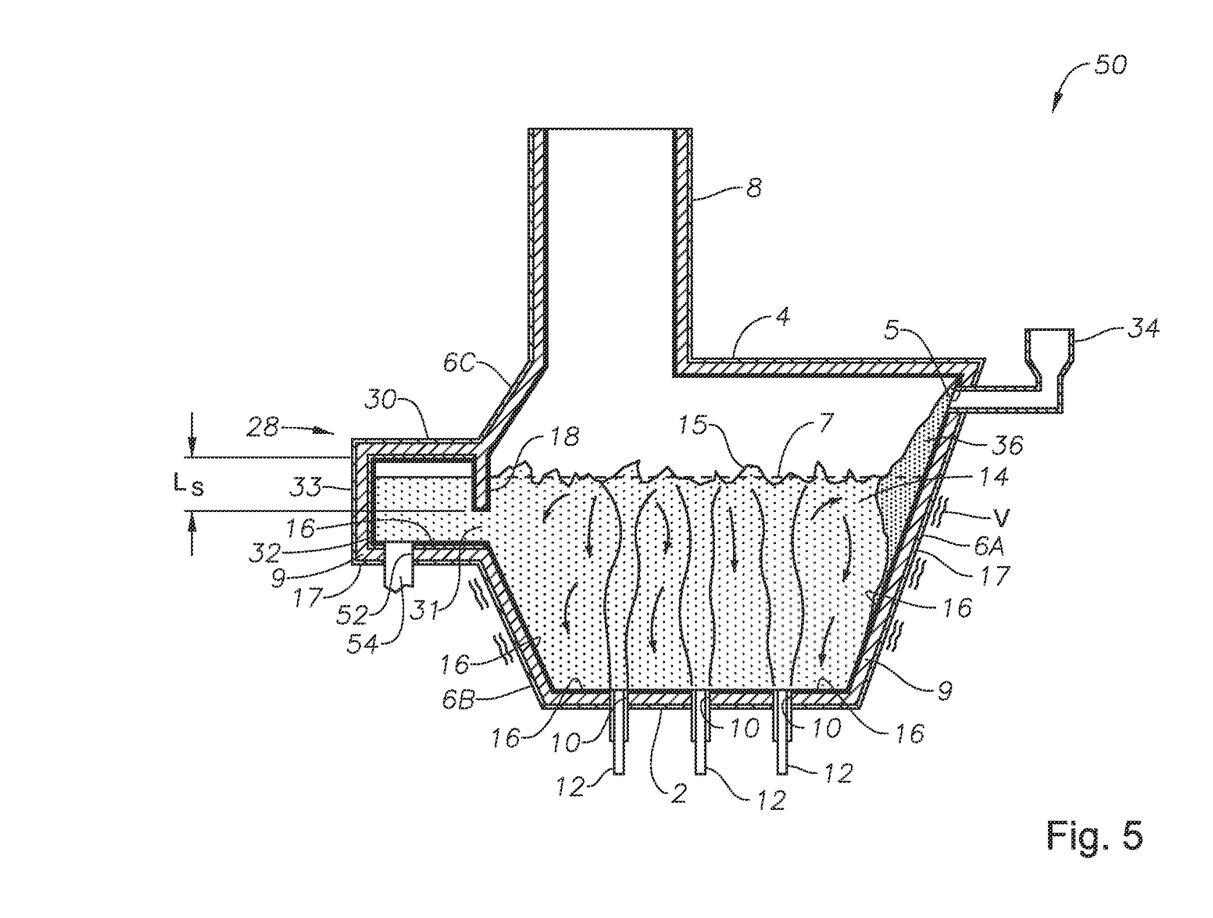
Figure 6:
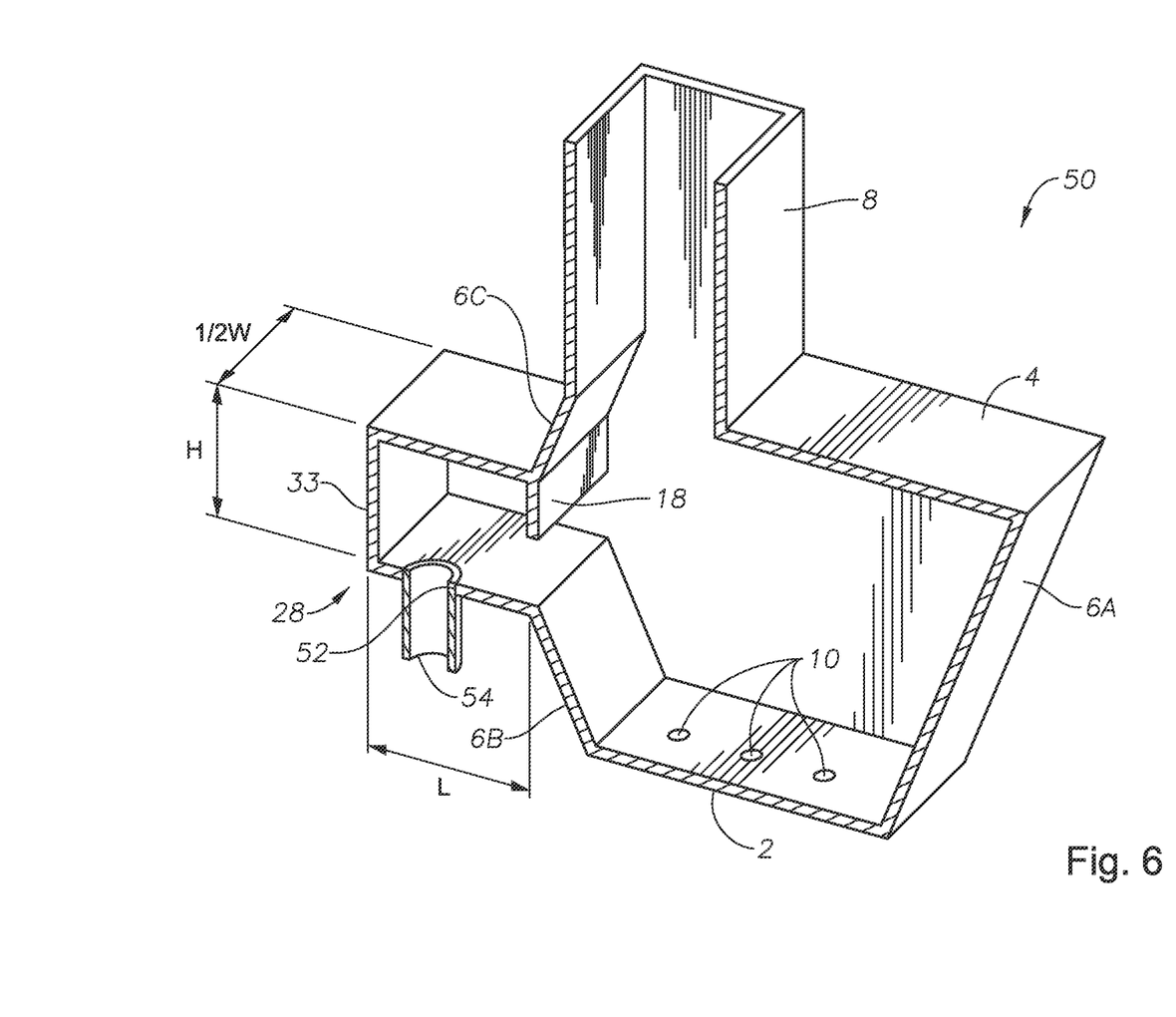

Referring now to the figures, FIGS. 1, 3, and 5, are vertical sectional views, of three melter apparatus embodiments in accordance with the present disclosure, while FIGS. 2, 4, and 6 are perspective views of the sectional views of the melter embodiments illustrated in FIGS. 1, 3, and 5, respectively. The same numerals and symbols are used for the same or similar features in the various figures. In the perspective views illustrated in FIGS. 2, 4, and 6, it will be understood in each case that some components are not illustrated in order to illustrate more clearly the key features of each embodiment. Melter apparatus embodiment 1 of FIGS. 1 and 2 comprises a floor 2, a roof or ceiling 4, a feed end wall 6A, a first portion of an exit end wall 6B, and a second portion of the exit end wall 6C. Each of floor 2, roof 4, and walls 6A, 6B, and 6C comprise a metal shell 17 and a refractory panel 9, some or all of which may be fluid-cooled. Feed end wall 6A and exit end wall portion 6B may form angles "α" and "β", respectively, with respect to floor 2, as indicated. Angles α and β may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. Exit end wall portion 6C may form an angle "γ" with respect to skimmer 18. Angle γ may be the range from 0 to about 70 degrees, or from about 30 degrees to about 75 degrees. Increasing this angle beyond these ranges may require more floor space for the melters, and/or more material of construction, both of which are generally undesirable. Decreasing this angle may promote escape of unmelted or melted material up stack 8, or deposition onto internal surfaces of stack 8, both of which are also undesirable. A frozen and/or highly viscous glass layer or layers 16 may be formed on the inside surfaces of walls 6A, 6B, due to the use of fluid-cooled panels for these walls.

Melter apparatus embodiment 1 further includes an exhaust stack 8, and openings 10 for floor-mounted submerged combustion burners 12, which create during operation a highly turbulent melt indicated at 14. Highly turbulent melt 14 may have an uneven top surface 15 due to the nature of submerged combustion. An average level 7 is illustrated with a dashed line. In certain embodiments, burners 12 are positioned to emit combustion products into molten glass in the melting zone 14 in a fashion so that the gases penetrate the melt generally perpendicularly to floor 2. In other embodiments, one or more burners 12 may emit combustion products into the melt at an angle to floor 2, where the angle may be more or less than 45 degrees, but in certain embodiments may be 30 degrees, or 40 degrees, or 50 degrees, or 60 degrees, or 70 degrees, or 80 degrees.

The initial raw material can be introduced into melter apparatus 1 on a batch, semi-continuous or continuous basis. In some embodiments, a port 5 is arranged at end 6A of melter apparatus 1 through which the initial raw material is introduced by a feeder 34. In some embodiments a "batch blanket" 36 may form along wall 6A, as illustrated.

Feed port 5 may be positioned above the average glass melt level, indicated by dashed line 7. The amount of the initial raw material introduced into melter apparatus 1 is generally a function of, for example, the capacity and operating conditions of melter apparatus 1 as well as the rate at which the molten material is removed from melter apparatus 1.

The initial raw material may include any material suitable for forming molten glass such as, for example, limestone, glass, sand, soda ash, feldspar and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. application 20080276652. The initial raw material can be provided in any form such as, for example, relatively small particles.

As noted herein, submerged combustion burners may produce violent turbulence of the molten glass and may result in a high degree of mechanical energy (denoted schematically by the symbol "V" for "vibration" in FIGS. 1-6) in the submerged combustion melter that, without modification, is undesirably transferred to the conditioning channel. Vibration may be due to one or more impacts from sloshing of molten glass, pulsing of the submerged combustion burners, popping of large bubbles above submerged burners, ejection of molten glass from main glass melt against the walls and ceiling of melter, and the like. Melter apparatus of the present disclosure have one or more features that attempt to preserve the benefits of submerged combustion, while decreasing some of the perceived or actual disadvantages. One important aspect of melter apparatus embodiment 1 is provision of a melter exit structure 28 for discharging the molten glass. Melter exit structure 28 is positioned generally downstream of melter exit ends 6B, 6C as illustrated of FIGS. 1 and 2, and fluidly and mechanically connects the melter vessel to a molten glass conditioning channel or other structure (not illustrated), such as a distribution channel, forehearth, and the like. Melter exit structure 28 comprises a fluid-cooled transition channel 30, having generally rectangular cross-section in embodiment 1, although any other cross-section would suffice, such as hexagonal, trapezoidal, oval, circular, and the like. Regardless of cross-sectional shape, fluid-cooled transition channel 30 is configured to form a frozen glass layer or highly viscous glass layer, or combination thereof, on inner surfaces of fluid-cooled transition channel 30 and thus protect melter exit structure 28 from the mechanical energy imparted from the melter vessel to melter exit structure 28.

As illustrated schematically in FIG. 2, melter exit structure 28 may in certain embodiments comprise an essentially rectangular, fluid-cooled, ceramic or metallic box having a length L, a width W, a height H. In these embodiments, length L may range from about 5 to about 50 percent, or from about 10 to about 40 percent, of the entire length of the melter apparatus. The width W of melt exit structure 28 may be the same as the width of the melter apparatus (as illustrated in FIG. 2), or may be less or more than the width of the melter apparatus. The height H may range from about 5 to about 50 percent, or from about 10 to about 40 percent, of the entire height of the melter apparatus, measured from floor 2 to ceiling 4. Melter length, width and height depend primarily on the amount of raw material to be fed, the amount of molten glass to be produced, and the desired throughputs mentioned herein.

Another important aspect of melter apparatus embodiment 1 is provision of a fluid-cooled skimmer 18 extending downward from the ceiling of the melter vessel and positioned upstream of fluid-cooled transition channel 30. Fluid-cooled skimmer 18 has a lower distal end 20 extending a distance $L_s$ ranging from about 1 inch to about 12 inches (from about 2.5 cm to about 30 cm) below the average melt level 7. Fluid-cooled skimmer 18 may be configured to form a frozen glass layer or highly viscous glass layer, or combination thereof, on its outer surfaces. Skimmer lower distal end 20 defines, in conjunction with a lower wall of melter exit structure 28, a throat 31 of the melter vessel, throat 31 configured to control flow of molten glass from the melter vessel into melter exit structure 28. Preferably, the throat 31 is arranged below average melt level 7. Molten material can be removed from melter exit structure 28 on a batch, semi-continuous basis or continuous basis. In an exemplary embodiment, the molten material continuously flows through throat 31 and generally horizontally through melter exit structure 28, and is removed continuously from melter exit structure 28 to a conditioning channel (not illustrated). Thereafter, the molten material can be processed by any suitable known technique, for example, a process for forming glass fibers.

Yet another important aspect in certain embodiments is the provision of an overlapping refractory material layer 32 on at least the inner surface of fluid-cooled transition channel 30 that are exposed to molten material. In certain embodiments the overlapping refractory material may comprise a seamless insert of dense chrome, molybdenum, or other dense ceramic or metallic material. The dense chrome or other refractory material may be inserted into the melter exit structure and provides a seamless transition from the melter vessel to a conditioning channel or other structure (not illustrated).

Another feature of melter apparatus embodiment 1 is the provision of a fluid-cooled dam opening 22 in the upper wall or ceiling of melt exit structure 28. Dam opening 22 accommodates a movable, fluid-cooled dam 24, which is illustrated schematically in FIG. 1 in a retracted position. Dam 24 may be manipulated by a prime mover 26, such as one or more motors, jack screws, or the like. Fluid-cooled dam 24 comprises dimensions allowing the dam to be extended an entire distance from top to bottom of fluid-cooled transition channel 30 and completely isolate the melting zone of the melter vessel from the conditioning channel.

FIGS. 3-6 illustrate further embodiments and features of melter apparatus of this disclosure. FIGS. 3 and 4 illustrate schematically a melter apparatus embodiment 40, and illustrates that skimmer 18 may extend substantially more into the melt than skimmer 18 in embodiment 1. In embodiment 40, skimmer 18 is positioned a distance $L_2$ from the exit of melter exit structure 28. $L_2$ is greater than the length $L_1$, which is the length of the lower wall of melter exit structure 28. The absolute dimensions of $L_1$ and $L_2$ are not critical except that $L_2$ must be greater than $L_1$. For example, $L_2$ may be twice that of $L_1$, or $L_2$ may be 1.5 times that of $L_1$. The ratio of length $L_2$ and $L_1$ will also depend on angle "β." In melter apparatus embodiment 40, skimmer 18 extends downwardly substantially in line with a downstream wall of stack 8 such that lower distal end 20 forms a submerged throat 31 with end wall portion 6B. Lower distal end 20 may extend sufficiently low so that submerged throat 31 is positioned roughly in the lowest one third of the molten bath, or even in the lowest one fourth or lowest one eighth portion of the molten bath. This submerged throat position forces the melt generally in the lower regions of the melter apparatus 50 to exit prior to molten glass in the upper or even the middle regions of the apparatus. Further, the molten glass travels generally vertically through a generally less turbulent zone 35 after passing through throat 31, and then generally horizontally through and out of melter exit structure 28. By submerging throat 31 in embodiment 50, there is a reduction of the transfer of mechanical energy from the melter to the conditioning channel.

FIGS. 5 and 6 illustrate schematically another melter apparatus embodiment 50, an embodiment similar to embodiment 1 illustrated schematically in FIGS. 1 and 2, except that melter exit structure 28 in embodiment 50 comprises a fluid-cooled end wall 33 and at least one opening 52 in a bottom wall of melter exit structure 28. Melter apparatus embodiment 50 as illustrated has one opening 52, which accommodates one downwardly protruding melt flow tube 54. End wall 33 effectively forces molten material to change flow direction, from substantially horizontal to substantially vertically downward. This flow pattern completely decouples melt exit structure 28 and fluid-cooled transition channel 30 from the conditioning channel (not illustrated), substantially reducing or completely eliminating transfer of all mechanical energy, such as vibrational energy, from the melter to the condition channel, while maintaining all or substantially all of the desired heat transfer.

Figure 7:
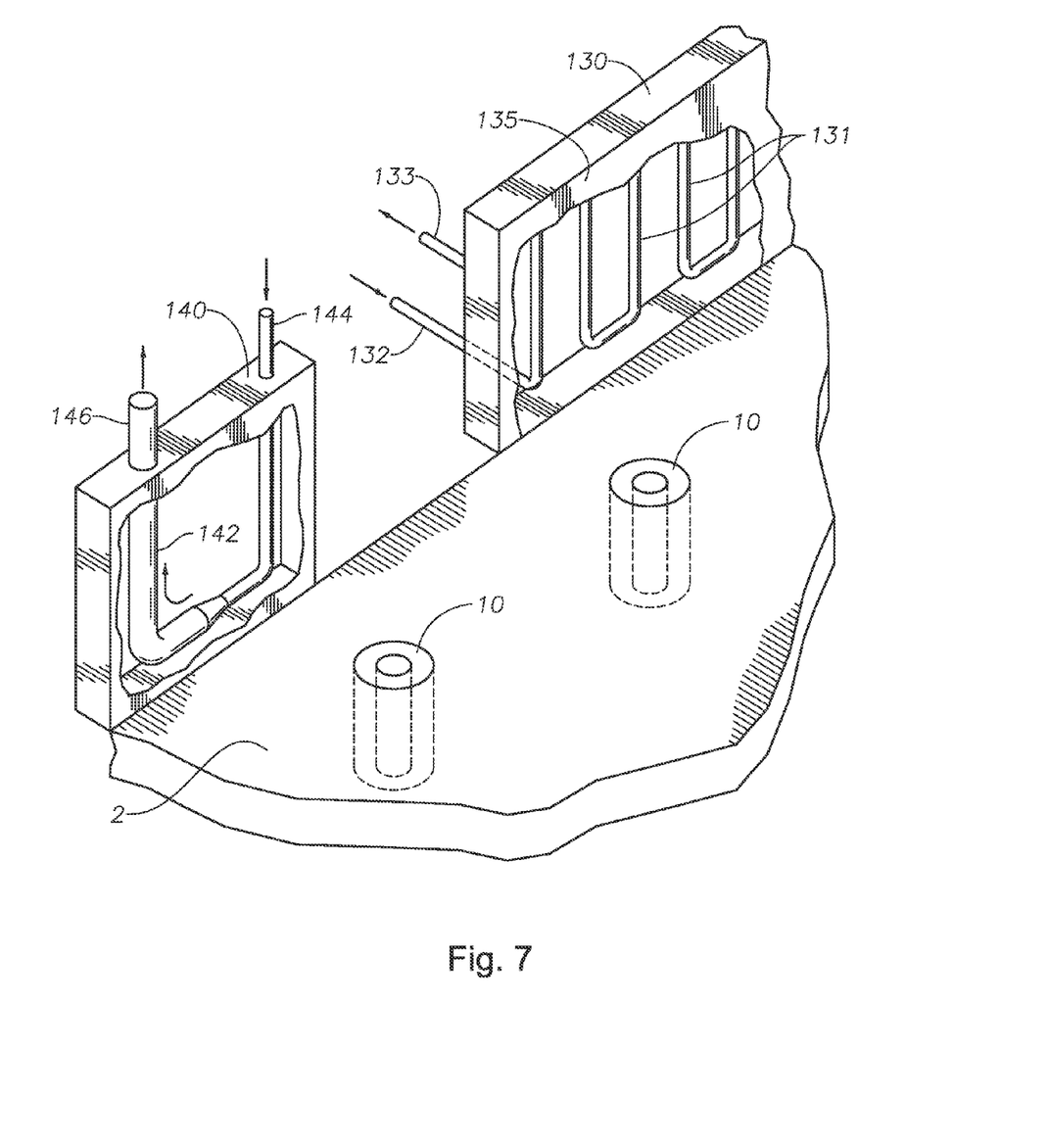
FIG. 7 is a perspective view of one cooled panel useful in melters of the present disclosure.

FIG. 7 is a perspective view of a portion of a melter, melter exit structure, skimmer, or dam illustrating two embodiments of fluid-cooled panels useful in melter apparatus of the present disclosure. Also illustrated in FIG. 7 is a portion of melter floor 2, and three floor-mounted burners 12. A first cooled-panel 130 is liquid-cooled, having one or more conduits or tubing 131 therein, supplied with liquid through conduit 132, with another conduit 133 discharging warmed liquid, routing heat transferred from inside the melter (or other component being cooled) to the liquid away from the melter or other component. Liquid-cooled panel 130 as illustrated also includes a thin refractory liner 135, which minimizes heat losses from the melter or other component, but allows formation of a thin frozen glass shell to form on the surfaces and prevent any refractory wear and associated glass contamination. Another cooled panel 140 is illustrated, in this case an air-cooled panel, comprising a conduit 142 that has a first, small diameter section 144, and a large diameter section 146. Warmed air transverses conduit 142 in the direction of the curved arrow. Conduit section 146 is larger in diameter to accommodate expansion of the air as it warms. Air-cooled panels such as illustrated in FIG. 7 are described more fully in U.S. Pat. No. 6,244,197.

Figure 8:
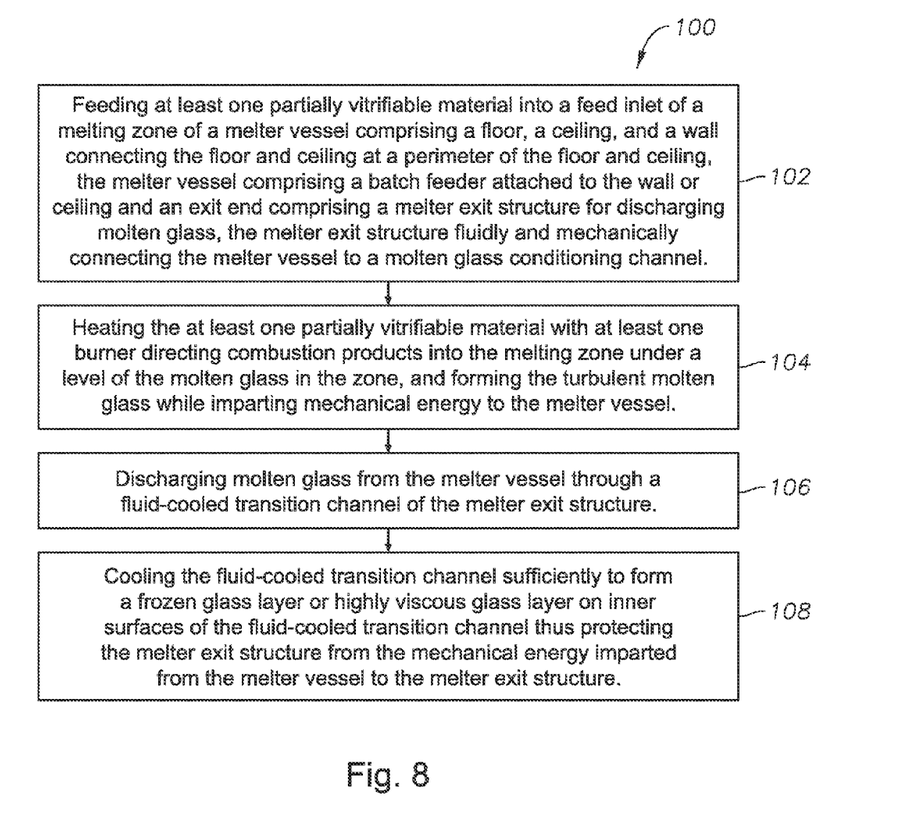
FIGS. 8, 9 and 10 are logic diagrams illustrating three methods in accordance with the present disclosure.
Figure 9:
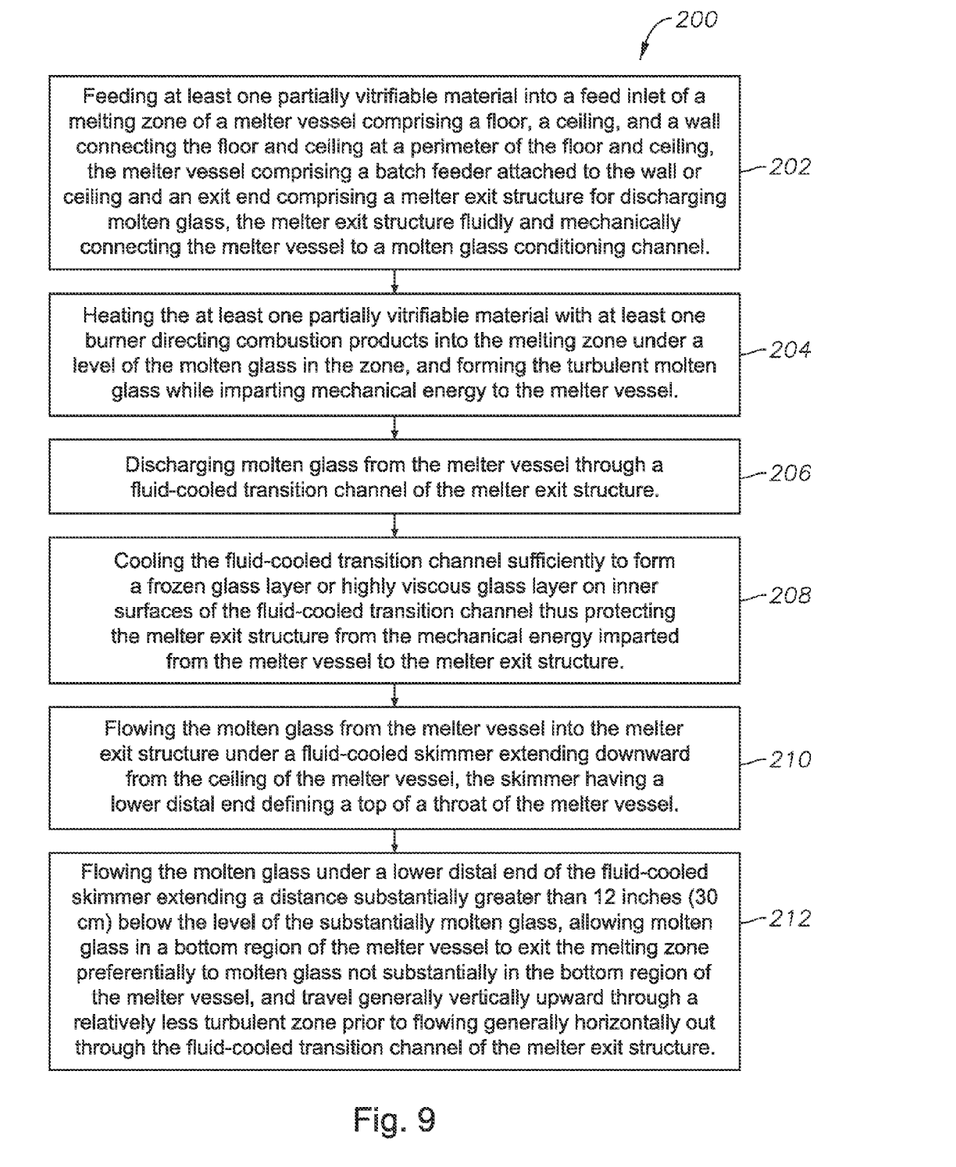
Figure 10:
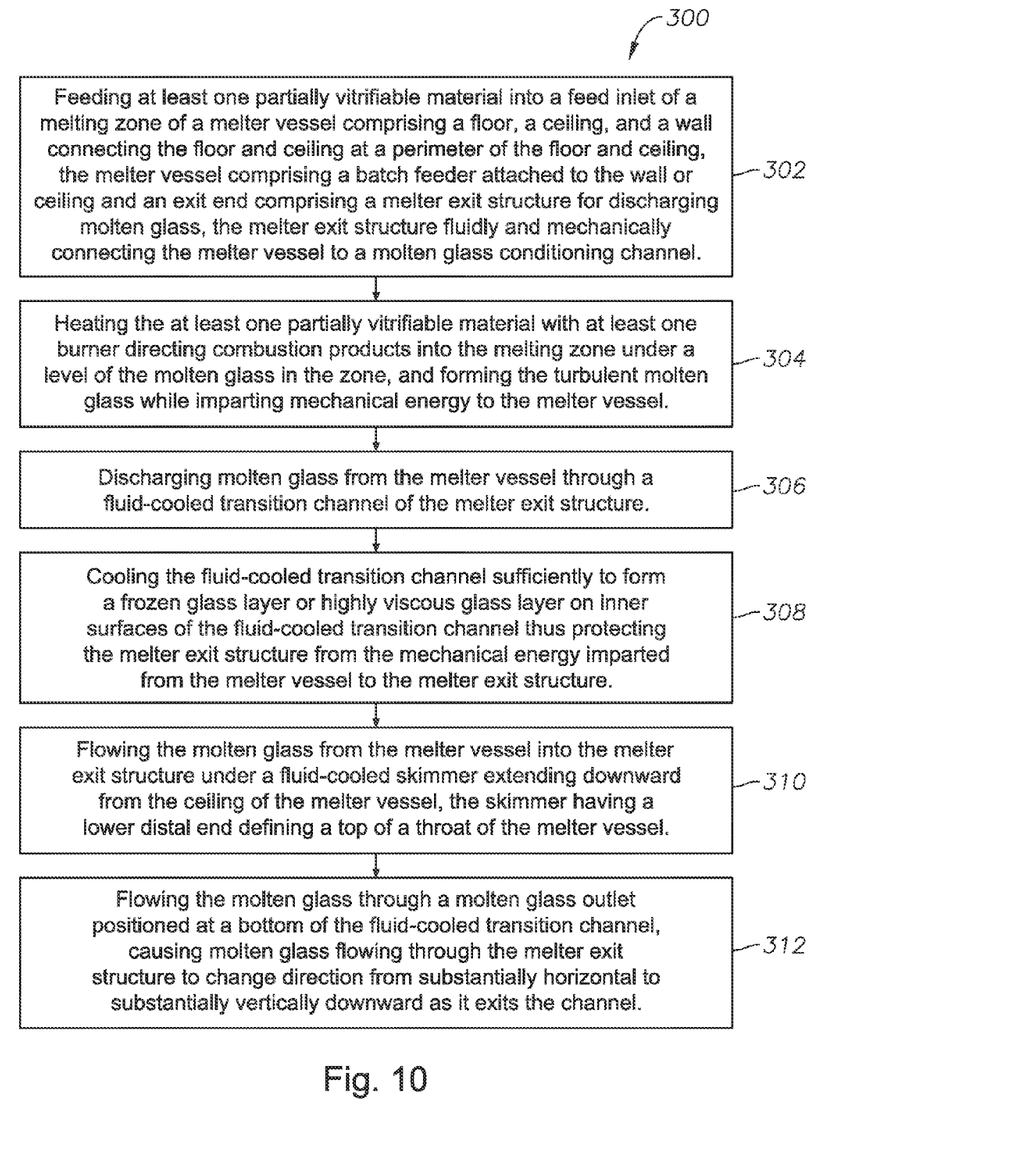

FIGS. 8, 9 and 10 are logic diagrams illustrating three methods in accordance with the present disclosure. Embodiment 100 of FIG. 8 includes the steps of feeding at least one partially vitrifiable material into a feed inlet of a melting zone of a melter vessel comprising a floor, a ceiling, and a wall connecting the floor and ceiling at a perimeter of the floor and ceiling, the melter vessel comprising a batch feeder attached to the wall or ceiling and an exit end comprising a melter exit structure for discharging molten glass, the melter exit structure fluidly and mechanically connecting the melter vessel to a molten glass conditioning channel, box 102. The method further includes heating the at least one partially vitrifiable material with at least one burner directing combustion products into the melting zone under a level of the molten glass in the zone, and forming the turbulent molten glass while imparting mechanical energy to the melter vessel, box 104. The method also includes discharging molten glass from the melter vessel through a fluid-cooled transition channel of the melter exit structure, box 106, and cooling the fluid-cooled transition channel sufficiently to form a frozen glass layer or highly viscous glass layer on inner surfaces of the fluid-cooled transition channel thus protecting the melter exit structure from the mechanical energy imparted from the melter vessel to the melter exit structure, box 108.

FIG. 9 is a logic diagram of another method embodiment 200, which includes the steps of feeding at least one partially vitrifiable material into a feed inlet of a melting zone of a melter vessel comprising a floor, a ceiling, and a wall connecting the floor and ceiling at a perimeter of the floor and ceiling, the melter vessel comprising a batch feeder attached to the wall or ceiling and an exit end comprising a melter exit structure for discharging molten glass, the melter exit structure fluidly and mechanically connecting the melter vessel to a molten glass conditioning channel, box 202, and heating the at least one partially vitrifiable material with at least one burner directing combustion products into the melting zone under a level of the molten glass in the zone, and forming the turbulent molten glass while imparting mechanical energy to the melter vessel, box 204. The method also includes discharging molten glass from the melter vessel through a fluid-cooled transition channel of the melter exit structure, box 206, and cooling the fluid-cooled transition channel sufficiently to form a frozen glass layer or highly viscous glass layer on inner surfaces of the fluid-cooled transition channel thus protecting the melter exit structure from the mechanical energy imparted from the melter vessel to the melter exit structure, box 208. The method also includes flowing the molten glass from the melter vessel into the melter exit structure under a fluid-cooled skimmer extending downward from the ceiling of the melter vessel, the skimmer having a lower distal end defining a top of a throat of the melter vessel, box 210, and flowing the molten glass under a lower distal end of the fluid-cooled skimmer extending a distance substantially greater than 12 inches (30 cm) below the level of the substantially molten glass, allowing molten glass in a bottom region of the melter vessel to exit the melting zone preferentially to molten glass not substantially in the bottom region of the melter vessel, and travel generally vertically upward through a relatively less turbulent zone prior to flowing generally horizontally out through the fluid-cooled transition channel of the melter exit structure, box 212.

FIG. 10 is a logic diagram of another method embodiment 300, which includes the steps of feeding at least one partially vitrifiable material into a feed inlet of a melting zone of a melter vessel comprising a floor, a ceiling, and a wall connecting the floor and ceiling at a perimeter of the floor and ceiling, the melter vessel comprising a batch feeder attached to the wall or ceiling and an exit end comprising a melter exit structure for discharging molten glass, the melter exit structure fluidly and mechanically connecting the melter vessel to a molten glass conditioning channel, box 302, and heating the at least one partially vitrifiable material with at least one burner directing combustion products into the melting zone under a level of the molten glass in the zone, and forming the turbulent molten glass while imparting mechanical energy to the melter vessel, box 304. The method also includes discharging molten glass from the melter vessel through a fluid-cooled transition channel of the melter exit structure, box 306, and cooling the fluid-cooled transition channel sufficiently to form a frozen glass layer or highly viscous glass layer on inner surfaces of the fluid-cooled transition channel thus protecting the melter exit structure from the mechanical energy imparted from the melter vessel to the melter exit structure, box 308. The method includes flowing the molten glass from the melter vessel into the melter exit structure under a fluid-cooled skimmer extending downward from the ceiling of the melter vessel, the skimmer having a lower distal end defining a top of a throat of the melter vessel, box 310, and flowing the molten glass through a molten glass outlet positioned at a bottom of the fluid-cooled transition channel, causing molten glass flowing through the melter exit structure to change direction from substantially horizontal to substantially vertically downward as it exits the channel, box 312.

In operation of melter apparatus of this disclosure, feed material, such as E-glass batch (melts at about 1400° C.), insulation glass batch (melts at about 1200° C.), or scrap in the form of glass fiber mat and/or insulation having high organic binder content, glass cullet, and the like, is fed to the melter through a feeder 34 and melter inlet 5. One or more submerged combustion burners 12 are fired to melt the feed materials and to maintain a turbulent molten glass melt 14. Molten glass moves toward melter exit structure 28, and is discharged from the melter. Combustion product gases (flue gases) exit through stack 8, or may be routed to heat recovery apparatus, as discussed herein. If oxy-fuel combustion is employed in some or all burners, the general principle is to operate combustion in the burners in a manner that replaces some of the air with a separate source of oxygen. The overall combustion ratio may not change. Importantly, the throughput of melter apparatus described in the present disclosure may be 2 $ft^2$ per short ton per day (2 $ft^2$/stpd) or less, and in some embodiments 0.5 $ft^2$/stpd or less. This is at least twice, in certain embodiments ten times the throughput of conventional melter apparatus.

Melter apparatus described in accordance with the present disclosure may be constructed using only refractory cooled panels, and a thin refractory lining, as discussed herein. The thin refractory coating may be 1 centimeter, 2 centimeters, 3 centimeters or more in thickness, however, greater thickness may entail more expense without resultant greater benefit. The refractory lining may be one or multiple layers. Alternatively, melters described herein may be constructed using cast concretes such as disclosed in U.S. Pat. No. 4,323,718. The thin refractory linings discussed herein may comprise materials described in the 718 patent, which is incorporated herein by reference. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, all of which are incorporated herein by reference in their entirety. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

Melter apparatus in accordance with the present disclosure may also comprise one or more wall-mounted submerged combustion burners, and/or one or more roof-mounted burners. Roof-mounted burners may be useful to pre-heat the melter apparatus melting zone 14 and serve as ignition sources for one or more submerged combustion burners 12. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 12. In certain embodiments, if there is a possibility of carryover of batch particles to the exhaust, one or more roof-mounted burners could be used to form a curtain to prevent particulate carryover. In certain embodiments, all submerged combustion burners 12 are oxy-fuel burners (where "oxy" means oxygen, or oxygen-enriched air, as described earlier), but this is not necessarily so in all embodiments; some or all of the submerged combustion burners may be air-fuel burners. Furthermore, heating may be supplemented by electrical heating in certain embodiments, in certain melter zones.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio is between 0.9 and 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired, and/or the degree of turbulence may so great as to be detrimental to refractory, or other materials of construction. High turbulence may also produce an undesired amount of foam or bubbles in the melt that cannot be refined out of the melt if the conditioning facilities are not adequate.

In certain embodiments of the disclosure it may be desired to implement heat recovery. In embodiments of the disclosure employing a heat transfer fluid for heat recovery, it is possible for a hot intermediate heat transfer fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated. Furthermore, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Apparatus and methods in accordance with the present disclosure include those wherein the primary means for transferring heat are double shell radiation recuperators. Preheater means useful in apparatus and methods described herein may comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Melter apparatus and process embodiments of the disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary apparatus and methods of the disclosure comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

The burners used may provide an amount of heat which is effective to melt the initial raw material to form the molten material 14, and to maintain the molten material 14 in its molten state. The optimal temperature for melting the initial raw material and maintaining the molten material 14 in its molten state can depend on, for example, the composition of the initial raw material and the rate at which the molten material 14 is removed from the melter apparatus. For example, the maximum temperature in the melter apparatus can be at least about 1400° C., preferably from about 1400° C. to about 1650° C. The temperature of the molten material 14 can be from about 1050° C. to about 1450° C.; however, apparatus and methods of the present disclosure are not limited to operation within the above temperature ranges. The molten material 14 removed from the melter apparatus is typically a substantially homogeneous composition, but is not limited thereto.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A melter apparatus comprising:
a melter vessel comprising floor, a ceiling, a wall connecting the floor and ceiling at a perimeter of the floor and ceiling, the wall comprises fluid-cooled panels, a melting zone being defined by the floor, ceiling and wall, and a plurality of burners, at least some of which are positioned to direct combustion products into the melting zone under a level of molten glass in the melting zone and form a turbulent molten glass imparting mechanical energy to the melter vessel, the melter vessel comprising a batch feeder attached to the wall or ceiling above the level, and an exit end comprising a melter exit structure for discharging the molten glass, the melter exit structure fluidly and mechanically connecting the melter vessel to a molten glass conditioning channel, the wall comprising a feed end wall, a first portion of an exit end wall connecting the floor to an inlet of the melter exit structure, and a second portion of an exit end wall connecting the ceiling to an inlet of the melter exit structure, wherein the feed end wall forms and angle α with floor, the first portion of the exit end wall forms an angle β with the floor, angles α and β may be the same or different and range from about 45 degrees to about 75 degrees, and the second portion of the exit wall forms an angle γ with the ceiling ranging from about 30 degrees to about 75 degrees,
wherein the melter exit structure comprises a fluid-cooled transition channel configured to form a frozen glass layer or highly viscous glass layer, or combination thereof, on inner surfaces of the fluid-cooled transition channel and thus protect the melter exit structure from the mechanical energy imparted from the melter vessel to the melter exit structure;
the melter apparatus comprising a fluid-cooled dam opening in a top of the fluid-cooled transition channel, and a movable fluid-cooled dam in the dam opening;
the melter apparatus comprising a fluid-cooled skimmer configured to form a frozen glass layer or highly viscous glass layer, or combination thereof, on outer surfaces thereof, the skimmer extending downward from the ceiling of the melter vessel and positioned upstream of the fluid-cooled transition channel, the skimmer having a lower distal end defining a top of a throat of the melter vessel, the throat configured to control flow of molten glass from the melter vessel into the melter exit structure.

2. The melter apparatus of claim 1 wherein the fluid-cooled dam comprises dimensions allowing the dam to be extended an entire distance from top to bottom of the fluid-cooled transition channel and completely isolate the melting zone of the melter vessel from the conditioning channel.

3. The melter apparatus of claim 1 wherein the lower distal end of the fluid-cooled skimmer extends a distance ranging from about 1 inch to about 12 inches (from about 2.5 cm to about 30 cm) but less than a height H of the melter exit structure.

4. The melter apparatus of claim 1 wherein the lower distal end of the fluid-cooled skimmer extends a distance substantially greater than 12 inches (30 cm) but less than to the floor of the melter, allowing molten glass in a bottom region of the melter vessel to exit preferentially to molten glass not substantially in the bottom region of the melter vessel.

5. The melter apparatus of claim 1 further comprising a seamless liner insert positioned inside the melter exit structure, the liner insert having an entrance and a discharge end, the entrance end configured to accept flow of molten glass from the throat, and the discharge end directing flow of molten glass to the conditioning channel.

6. The melter apparatus of claim 1 wherein the melter exit structure comprises a molten glass outlet positioned at a bottom of the fluid-cooled transition channel, causing molten glass flowing through the melter exit structure to change direction from substantially horizontal to substantially vertically downward as it exits the channel.

7. The melter apparatus of claim 1 wherein the lower distal end of the fluid-cooled skimmer extends a distance ranging from about 1 inch to about 12 inches (from about 2.5 cm to about 30 cm) but less than a height H of the melter exit structure, and wherein the melter exit structure comprises a molten glass outlet positioned at a bottom of the fluid-cooled transition channel, causing molten glass flowing through the melter exit structure to change direction from substantially horizontal to substantially vertically downward as it exits the channel.

8. A melter apparatus comprising:
- a melter vessel comprising floor, a ceiling, a wall connecting the floor and ceiling at a perimeter of the floor and ceiling, the wall comprises fluid-cooled panels, a melting zone being defined by the floor, ceiling and wall, and a plurality of burners, at least some of which are positioned to direct combustion products into the melting zone under a level of molten glass in the melting zone and form a turbulent molten glass imparting mechanical energy to the melter vessel, the melter vessel comprising a batch feeder attached to the wall or ceiling above the level, and an exit end comprising a melter exit structure for discharging the turbulent molten glass, the melter exit structure fluidly and mechanically connecting the melter vessel to a molten glass conditioning channel, the wall comprising a feed end wall, a first portion of an exit end wall connecting the floor to an inlet of the melter exit structure, and a second portion of an exit end wall connecting the ceiling to an inlet of the melter exit structure, wherein the feed end wall forms and angle $\alpha$ with floor, the first portion of the exit end wall forms an angle $\beta$ with the floor, angles $\alpha$ and $\beta$ may be the same or different and range from about 45 degrees to about 75 degrees, and the second portion of the exit wall forms an angle $\gamma$ with the ceiling ranging from about 30 degrees to about 75 degrees;
- wherein the melter exit structure comprises a fluid-cooled transition channel configured to form a frozen glass layer or highly viscous glass layer, or combination thereof, on inner surfaces of the fluid-cooled transition channel, the melter exit structure comprising a molten glass outlet positioned at a bottom of the fluid-cooled transition channel, causing molten glass flowing through the melter exit structure to change direction from substantially horizontal to substantially vertically downward as it exits the channel, and thus protect the melter exit structure from the mechanical energy imparted from the melter vessel to the melter exit structure;
- the melter apparatus further comprising a fluid-cooled skimmer configured to form a frozen glass layer or highly viscous glass layer, or combination thereof, on outer surfaces thereof, the skimmer extending downward from the ceiling of the melter vessel and positioned upstream of the fluid-cooled transition channel, the skimmer having a lower distal end defining a top of a throat of the melter vessel, the throat configured to control flow of molten glass from the melter vessel into the melter exit structure.

* * * * *